United States Patent [19]

Eriksson

[11] Patent Number: 4,677,677

[45] Date of Patent: Jun. 30, 1987

[54] ACTIVE SOUND ATTENUATION SYSTEM WITH ON-LINE ADAPTIVE FEEDBACK CANCELLATION

[75] Inventor: Larry J. Eriksson, Madison, Wis.

[73] Assignee: Nelson Industries Inc., Stoughton, Wis.

[21] Appl. No.: 777,928

[22] Filed: Sep. 19, 1985

[51] Int. Cl.$^4$ .......................... H04R 1/28; H04B 15/00; F01N 1/06; G10K 11/16

[52] U.S. Cl. .......................... 381/71; 381/73.1; 381/93

[58] Field of Search .......................... 381/73, 71, 99

[56] References Cited

U.S. PATENT DOCUMENTS

| | | | |
|---|---|---|---|
| 4,025,724 | 5/1977 | Davidson, Jr. et al. | 381/71 |
| 4,473,906 | 9/1984 | Warnaka et al. | 381/71 |
| 4,480,333 | 10/1984 | Ross | 381/71 |
| 4,489,441 | 12/1984 | Chaplin | 381/71 |
| 4,490,841 | 12/1984 | Chaplin | 381/71 |
| 4,527,282 | 7/1985 | Chaplin | 381/71 |
| 4,562,589 | 12/1985 | Warnaka | 381/71 |
| 4,589,133 | 5/1986 | Swinbanks | 381/71 |
| 4,589,137 | 5/1986 | Miller | 381/71 |
| 4,596,033 | 6/1986 | Swinbanks | 381/71 |

OTHER PUBLICATIONS

"Active Noise Reduction Systems in Ducts", J. Tichy, G. E. Warnaka and L. A. Poole, ASME Journal, Nov. 1984, pp. 1-7.

"Historical Review and Recent Development of Active Attenuators", H. G. Leventhall, Acoustical Society of America, 104th Meeting, Orlando, Nov. 1982, FIG. 8.

"Active Adaptive Sound Control in a Duct: A Computer Simulation", J. C. Burgess, Journal of Acoustic Society of America, 70(3), Sep. 1981, pp. 715-726.

"The Implementation of Digital Filters Using a Modified Widrow-Hoff Algorithm for the Adaptive Cancellation of Acoustic Noise", L. A. Poole, G. E. Warnaka and Richard C. Cutter, 1984, IEEE, CH 1945-5/84/0000-0233, pp. 21.7.1-21.7.4.

"VLSI Systems Designed for Digital Signal Processing", Bowen and Brown, vol. 1, Prentice Hall, Englewood Cliffs, New Jersey, 1982, pp. 80-87.

"Comments on 'An Adaptive Recursive LMS Filter'", Widrow et al, Proceedings of the IEEE, vol. 65, No. 9, Sep. 1977, pp. 1402-1404, FIG. 2.

Elliot and Nelson, I.S.V.R. Technical Report No. 127, Southampton University, England, published in U.S. Department of Commerce, National Technical Information Service, Bulletin No. PB85-189777, Apr. 1984, pp. 1-61.

Morgan, "An Analysis of Multiple Correlation Cancellation Loops with a Filter in the Auxiliary Path", IEEE Transactions Acoustics Speech, Signal Processing, vol. ASSP-28, No. 4, pp. 454-467.

"Echo Cancellation Algorithms", Gritton and Lin, IEEE ASSP Magazine, Apr. 1984, pp. 30-38.

"Aspects of Network and System Theory", Widrow, *Adaptive Filters*, edited by R. E. Kalman and N. DeClaris, Holt, Reinhart and Winston, New York, 1971, pp. 563-587.

*Primary Examiner*—Gene Z. Rubinson
*Assistant Examiner*—L. C. Schroeder
*Attorney, Agent, or Firm*—Andrus, Sceales, Starke & Sawall

[57] ABSTRACT

An active acoustic attenuation system (2) is provided for attenuating an undesirable output acoustic wave by introducing a cancelling acoustic wave from an omnidirectional speaker (14) at the output (8), and for adaptively compensating for feedback from the speaker (14) to the input (6) for both broad band and narrow band acoustic waves, without pre-training. The feedback path (20) is modeled with a single filter model (40) adaptively modeling the acoustic system (4) on-line without dedicated off-line pre-training, and also adaptively modeling the feedback path (20) from the speaker (14) to the input microphone (10) on-line for both broad band and narrow band acoustic waves without dedicated off-line pre-training, and outputting a correction signal to the speaker (14) to introduce a cancelling acoustic wave.

20 Claims, 11 Drawing Figures

ACTIVE SOUND ATTENUATION SYSTEM WITH ON-LINE ADAPTIVE FEEDBACK CANCELLATION

BACKGROUND AND SUMMARY

The invention relates to active acoustic attenuation systems, and more particularly to those systems providing sound cancellation in the presence of feedback sound from a compensating speaker or transducer, which sound is coupled back into the input and hence into the cancelling loop.

Prior feedback cancellation systems use a filter to compensate for feedback sound from the speaker to the input microphone. It is desirable that this filter be adaptive in order to match the changing characteristics of the feedback path. Prior systems will successfully adapt only for broad band noise input signals because the system input is uncorrelated with the output of the feedback cancellation filter. Uncorrelated signals average to zero over time. However, if the input noise contains narrow band noise such as a tone having a regular periodic or recurring component, as at a given frequency, the filter output will be correlated with the system input and will not converge. The filter may thus be used adaptively only in systems having exclusively broad band input noise.

Most practical systems, however, do experience narrow band noise such as tones in the input noise. The noted filter cannot be adaptively used in such systems. To overcome this problem, and as is known in the prior art, the filter has been pre-trained off-line with broad band noise only. This pre-adapted filter is then fixed and inserted into the system as a fixed element which does not change or adapt thereafter.

A significant drawback of the noted fixed filter is that it cannot change to meet changing feedback path characteristics, such as temperature or flow changes in the feedback path, which in turn change the speed of sound. During the pre-training process, the filter models a pre-determined set of given parameters associated with the feedback path, such as length, etc. Once the parameters are chosen, and the filter is pre-adapted, the filter is then inserted in the system and does not change thereafter during operation. This type of fixed filter would be acceptable in those systems where feedback path characteristics do not change over time. However, in practical systems the feedback path does change over time, including temperature, flow, etc.

It is not practical to always be shutting down the system and re-training the filter every time the feedback path conditions change, nor may it even be feasible where such changes occur rapidly, i.e., by the time the system is shut down and the filter re-trained off-line, the changed feedbackk path characteristic such as temperature may have changed again. For this reason, the above-noted fixed filter is not acceptable in most practical systems.

There is thus a need for truly adaptive feedback cancellation in a practical active acoustic attenuation system, where the characteristics of the feedback path may change with time. A system is needed wherein the feedback is adaptively cancelled on-line for both broad band and narrow band noise without dedicated off-line pre-training, and wherein the cancellation further adapts on-line for changing feedback path characteristics such as temperature and so on.

BRIEF DESCRIPTION OF THE DRAWINGS

Prior Art

Present Invention

Figure 5:
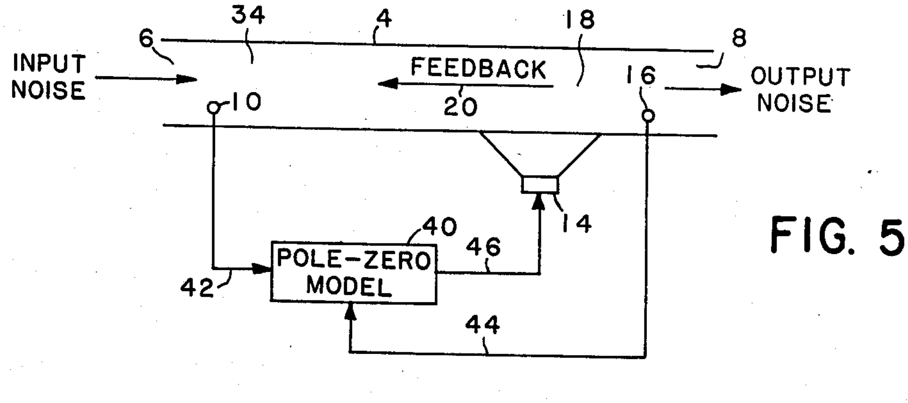

FIG. 5 is a schematic illustration of acoustic system modeling in accordance with the invention.

Figure 6:
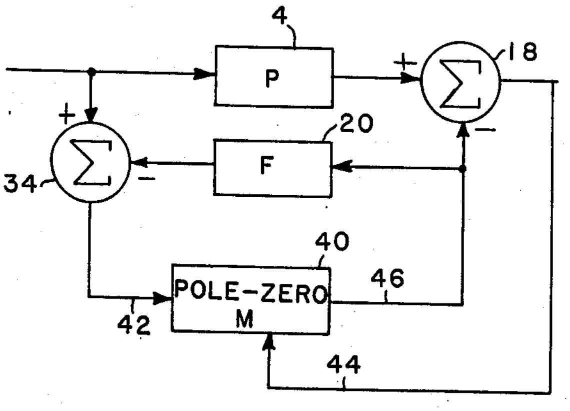

FIG. 6 is a block diagram of the system in FIG. 5.

Figure 7:
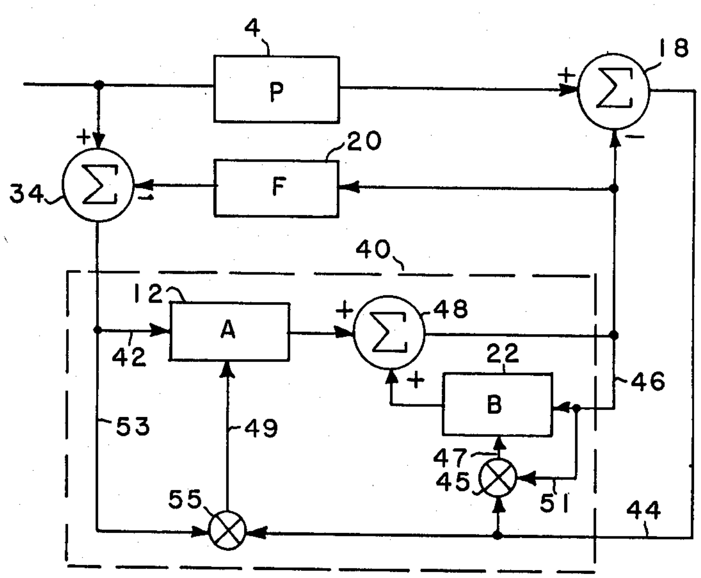

FIG. 7 is one embodiment of the system in FIG. 6.

Figure 8:
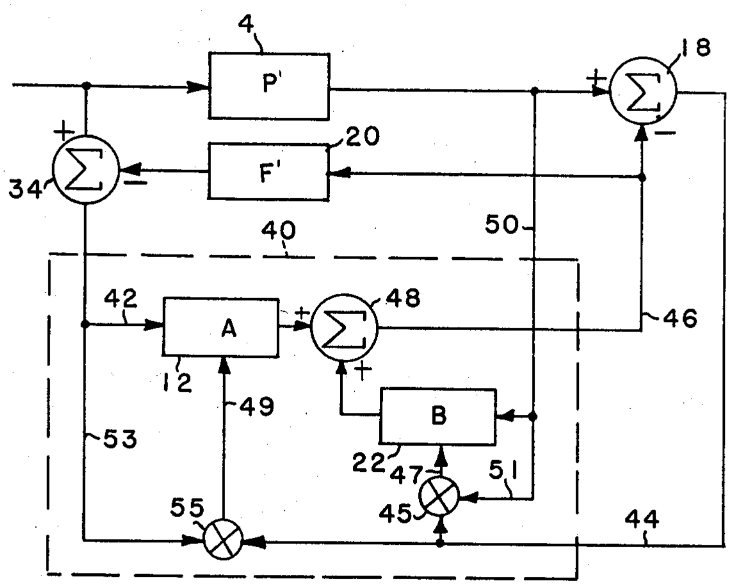

FIG. 8 is another embodiment of the system in FIG. 6.

Figure 9:
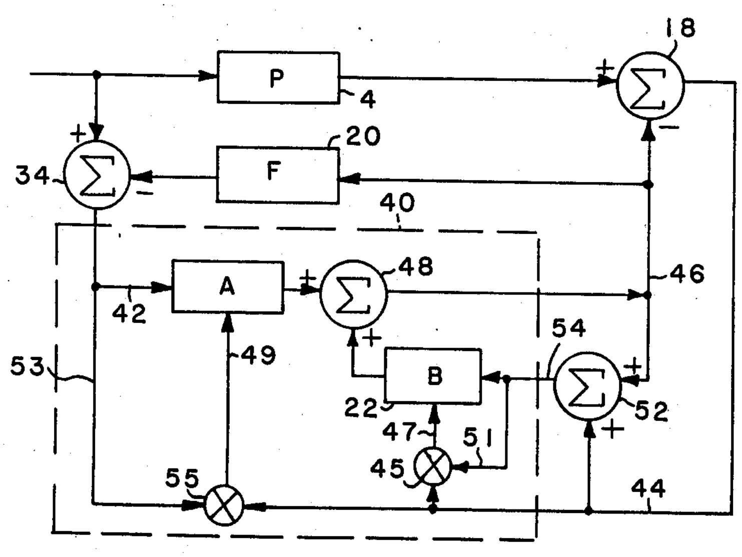

FIG. 9 is a further embodiment of the system in FIG. 6.

Figure 10:
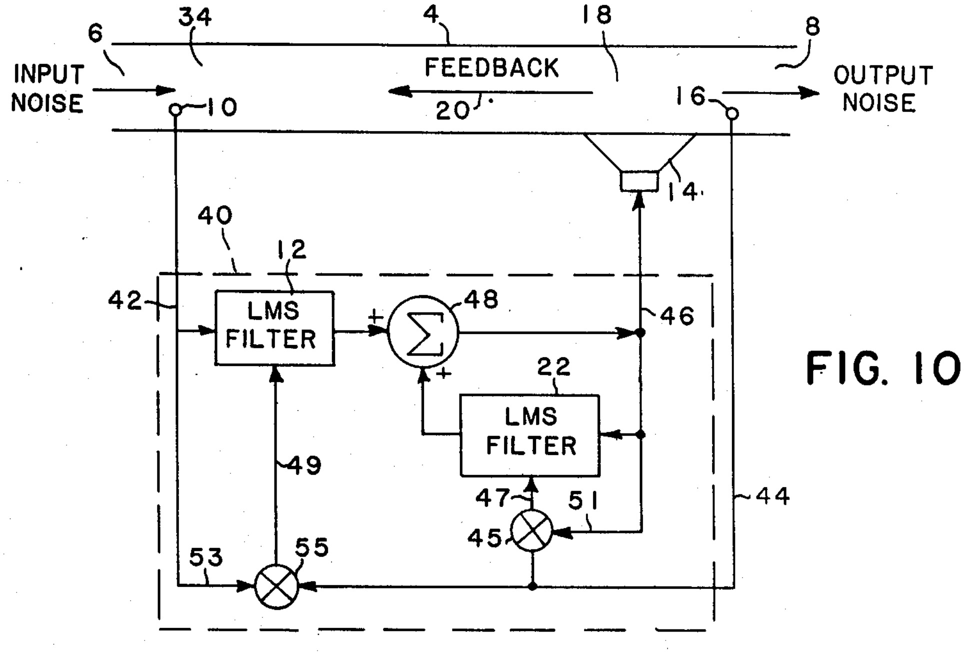

FIG. 10 is a schematic illustration of the system in FIG. 7.

Figure 11:
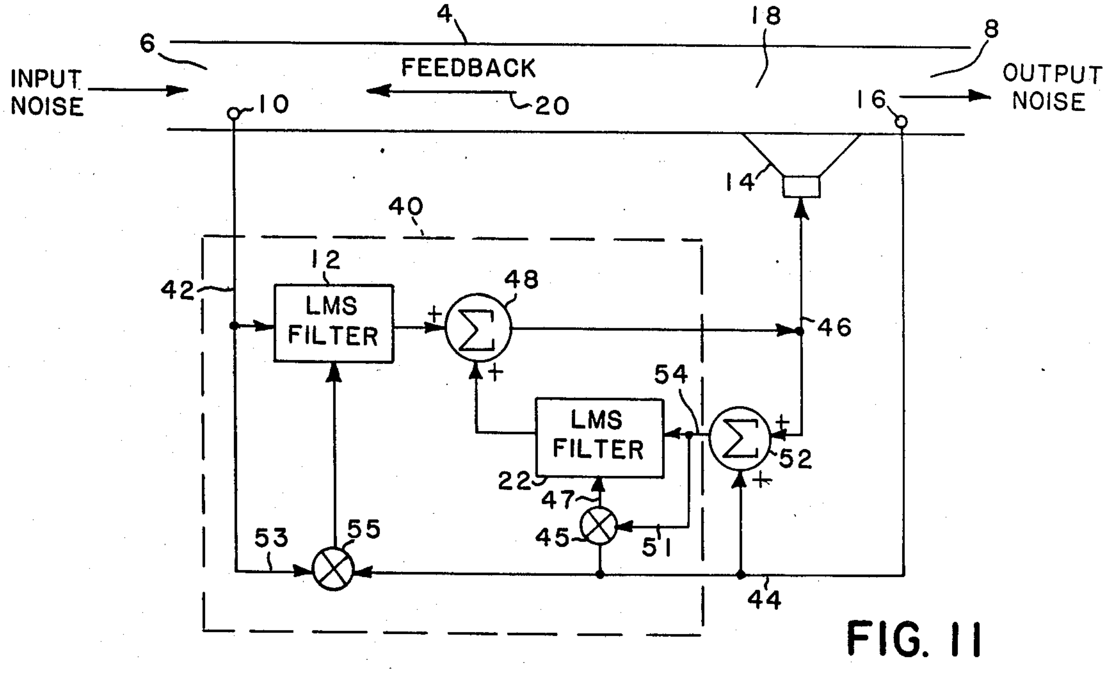

FIG. 11 is a schematic illustration of the system in FIG. 9.

DETAILED DESCRIPTION

Prior Art

Figure 1:
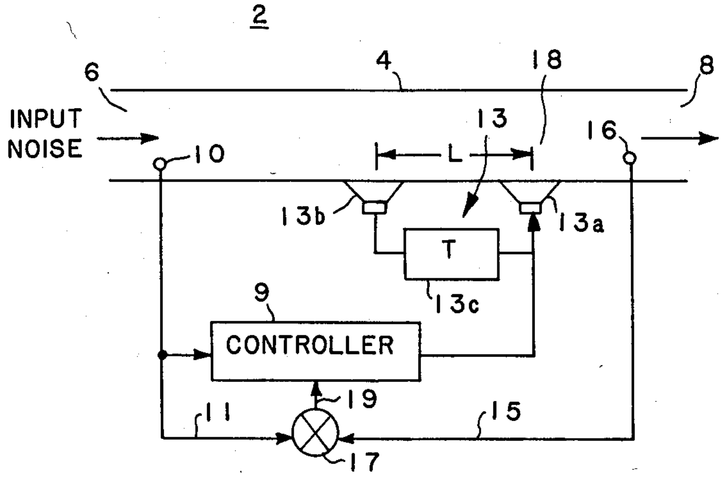
FIG. 1 PRIOR ART
FIG. 1 is a schematic illustration of an active acoustic attenuation system known in the prior art.
Figure 2:
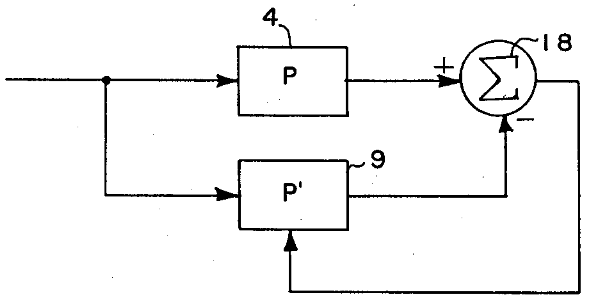
FIG. 2 PRIOR ART
FIG. 2 is a block diagram of the embodiment in FIG. 1.

FIG. 1 shows a known prior art acoustic system 2 including a propagation path or environment such as a duct or plant 4 having an input 6 for receiving input noise and an output 8 for radiating our outputting output noise. The input noise is sensed with an input microphone 10 and an input signal is sent to controller 9 which drives unidirectional speaker array 13 which in turn injects cancelling sound into duct or plant 4 which sound is optimally equal in amplitude and opposite in sign to the input noise to thus cancel same. The combined noise is sensed with an output microphone 16 whichprovides an error signal fed to controller 9 which then outputs a correction signal to speaker array 13 to adjust the cancelling sound. The error signal at 15 is typically multiplied with the input signal at 11 by multiplier 17 and the result provided as weight update signal 19, for example as discussed in Gritton and Lin "Echo Cancellation Algorithms", IEEE ASSP Magazine, April 1984, pp. 30–38. In some prior art references, multiplier 17 is explictly shown, and in others the multiplier 17 or other combination of signals 11 and 15 is inherent or implied in controller 9 and hence multiplier or combiner 17 may be deleted in various references, and such is noted for clarity. For example, FIG. 2 shows the deletion of such multiplier or combiner 17, and such function, if necessary, may be implied in controller 9, as is understood in the art.

Speaker array 13 is unidirectional and emits sound only to the right in FIG. 1, and does not emit sound leftwardly back to microphone 10, thus preventing feedback noise. The particular type of unidirectional speaker array shown is a Swinbanks type having a pair of speakers 13*a* and 13*b* separated by a distance L. The input to speaker 13*b* is an inverted version of the input to speaker 13*a* that has been delayed by a time $\tau = L/c$ where c is the speed of sound. This arrangement elminates acoustic feedback to microphone 10 over a limited frequency range. The time delay $\tau$ must be adjusted to account for changes in sound speed due to temperature variations. Other types of unidirectional speakers and arrays are also used, for example as shown in "Historical Review and Recent Development of Active Attenuators", H. G. Leventhall, Acoustical Society of America, 104th Meeting, Orlando, November, 1982, FIG. 8. In another system, a unidirectional microphone or an array of microphones is used at 10, to ignore feedback noise. Other methods for eliminating the feedback problem are also used, such as a tachometer sensing rotational speed, if a rotary source provides the input noise, and then introducing cancelling sound according to sensed RPM, without the use of a microphone sensing input noise at 10. Other systems employ electrical analog feedback to cancel feedback sound. Others employ a fixed delay to cancel known delayed feedback sound.

Acoustic system 4 is modeled by controller model 9 having a model input from input microphone 10 and an error input from output microphone 16, and outputting a correction signal to speaker array 13 to introduce cancelling sound such that the error signal approaches a given value, such as zero. FIG. 2 shows the modeling, with acoustic system 4 shown at the duct or plant P, the modeling controller 9 shown at P′, and the summation thereof shown at 18 at the output of speaker array 13 where the sound waves mix. The output of P is supplied to the plus input of summer 18, and the output of P′ is supplied to the minus input of summer 18. Model 9, which may use the least means square (LMS) algorithm, adaptively cancels undesirable noise, as is known, and for which further reference may be had to "Active Adaptive Sound Control in a Duct: A Computer Simulation", J. C. Burgess, Journal of Acoustic Society of America, 70(3), September, 1981, pp. 715–726, to Warnaka et al U.S. Pat. No. 4,473,906, and to Widrow, *Adaptive Filters*, "Aspects of Network and system Theory", edited by R. E. Kalman and N. DeClaris, Holt, Reinhart and Winston, New York, 1971, pp. 563–587. The system of FIGS. 1 and 2 operates properly when there is no feedback noise from speaker array 13 to input microphone 10.

Figure 3:
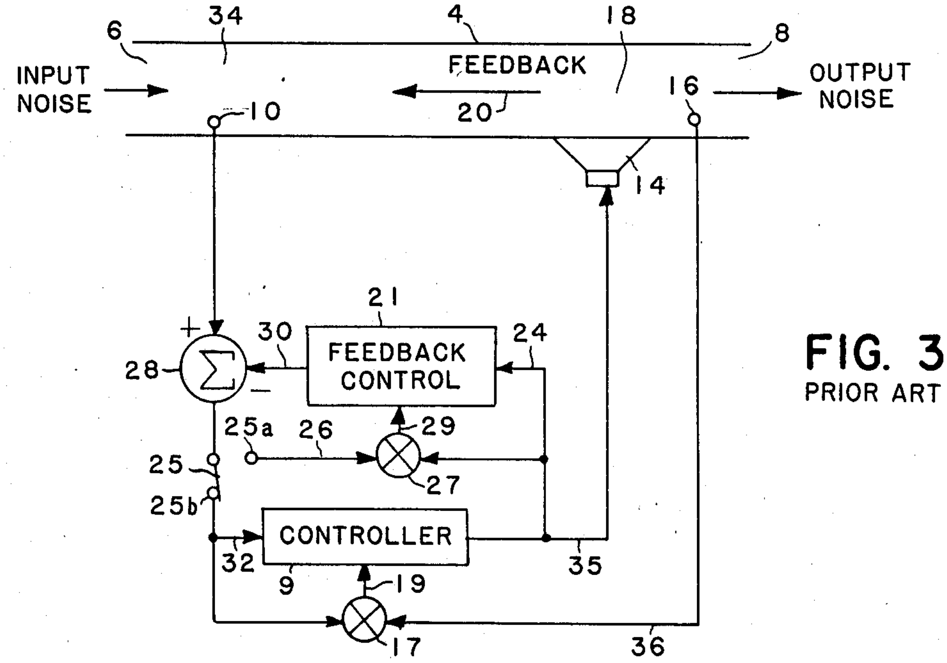
FIG. 3 PRIOR ART
FIG. 3 is a schematic illustration of a feedback cancellation active acoustic attenuation system known in the prior art.

It is also known to provide an omnidirectional speaker 14, FIG. 3, for introducing the cancelling sound, and to provide means for compensating feedback therefrom to the input microphone. As seen in FIG. 3, the cancelling sound introduced from omnidirectional speaker 14 not only mixes with the output noise to cancel same, but also travels leftwardly and is sensed at input microphone 10 along feedback path 20, as shown in FIG. 3 where like reference numerals are used from FIG. 1 where appropriate to facilitate clarity. In one known system for cancelling feedback, as shown in Davidson Jr. et al U.S. Pat. No. 4,025,724, the length of the feedback path is measured and then a filter is set accordingly to have a fixed delay for cancelling such delayed feedback noise. In another known sysem for cancelling feedback, a dedicated feedback control 21 in the form of a filter is provided, for example as shown in "Active Noise Reduction Systems in Ducts", Tichy et al, ASME Journal, November, 1984, page 4, FIG. 7, and labeled "adaptive uncoupling filter". Feedback control filter 21 is also shown in the above noted Warnaka et al U.S. Pat. No. 4,473,906 as "adaptive uncoupling filter 75" in FIGS. 14 and 15, and in "The Implentation of Digital Filters Using a Modified Widrow-Hoff Algorithm For the Adaptive Cancellation of Acoustic Noise", Poole et al, 1984 IEEE, CH 1945-5/84/0000-0233, pp. 21.7.1–21.7.4. Feedback control filter 21 typically has an error signal at 26 multiplied with the input signal at 24 by multiplier 27 and the result provided as weight update signal 29. Feedback control or adaptive uncoupling filter 21 is pre-trained off-line with a dedicated set of parameters associated with the feedback path. The filter is pretrained with broad band noise before the system is up and running, and such predetermine dedicated fixed filter is then inserted into the system.

In operation in FIG. 3, controller 9 is a least mean square (LMS) adaptive filter which senses the input from microphone 10 and outputs a correction signal to speaker 14 in an attempt to drive the error signal from microphone 16 to zero, i.e., controller 9 continually adaptively changes the output correction signal to speaker 14 until its error input signal from microphone 16 is minimized. Feedback control filter 21 has an input at 24 from the output of controller 9.

During off-line pre-training, switch 25 is used to provide filter 21 with an error input at 26 from summer 28. During the off-line pre-training, switch 25 is in its upward position to contact terminal 25*a*. During this pre-training, broad band noise is input at 35, and feedback control 21 changes its output 30 until its error input at 26 is minimized. The output 30 is summed at 28 with the input from microphone 10, and the result is fed to controller 21. Feedback control 21 is pre-trained off-line to model feedback path 20, and to introduce a cancelling component therefor at 30 to summer 28 to remove such feedback component from the input to controller 9 at 32. LMS adaptive filter 21 is typically a transversal filter and once its weighting coefficients are determined during the pre-training process, such coefficients are kept fixed thereafter when the system is up and running in normal operation.

After the pre-training process, switch 25 is used to provide an input to controller 9, and the weighting coefficients are kept constant. After the pre-training process and during normal operation, switch 25 is in its downward position to contact terminal 25*b*. The system is then ready for operation, for receiving input noise at 6. During operation, feedback control 21 receives no error signal at 26 and is no longer adaptive, but instead is a fixed filter which cancels feedback noise in a fixed manner. The system continues to work even if narrow band noise such as a tone is received at input 6. However, there is no adaptation of the filter 21 to changes in the feedback path due to temperature variations and so on.

Figure 4:
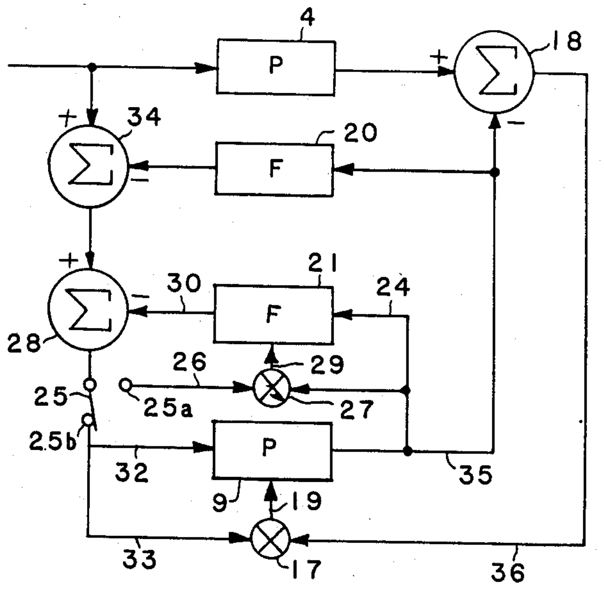
FIG. 4 PRIOR ART
FIG. 4 is a block diagram of the embodiment in FIG. 3.

FIG. 4 shows the system of FIG. 3 with feedback path 20 summed at 34 with the input noise adjacent microphone 10. Fixed feedback control cancellation filter 21 is shown at F′, and adaptive controller 9 at P′. Adaptive controller 9 at P′ models the duct or plant 4 and senses the input at 32 and outputs a correction signal at 35 and varies such correction signal until the error signal at 36 from summer 18 approaches zero, i.e., until the combined noise at microphone 16 is minimized. Fixed filter 21 at F′ models the feedback path 20 and removes or uncouples the feedback component at summer 28 from the input 32 to filter 9. This prevents the feedback component from speaker 14 from being coupled back into the input of the system model P′. As above noted, the error signal at 26 is only used during the training process prior to actual system operation.

It is also known that propagation delay between speaker 14 and microphone 16 if any, may be compensated by incorporating a delay element in input line 33 to compensate for the inherently delayed error signal on line 36.

Feedback model F' at filter 21 will successfully adapt for broad band noise because the system input is uncorrelated with the output of the feedback cancellation filter. Filter 21 may thus model the predetermined feedback path according to the preset feedback path characteristic. However, if the input noise contains any narrow band noise such as a tone having a regular periodic or recurring component, as at a given frequency, the output of filter 21 will be correlated with the system input and will continue to adapt and not converge. Filter 21 may thus be used adaptively only in systems having exclusively broad band input noise. Such filter is not amenable to systems where the input noise may include any narrow band noise.

Most practical systems do have narrow band noise in the input noise. Thus, in practice, filter 21 is pre-adapted and fixed to a given set of predetermined feedback path characteristics, and does not change or adapt to differing feedback path conditions over time, such as temperature, flow rate, and the like, which affect sound velocity. It is not practical to always be retraining the filter every time the feedback path conditions change, nor may it even be feasible where such changes occur rapidly, i.e., by the time the system is shut down and the filter retrained off-line, the changed feedback path characteristic such as temperature may have changed again.

Thus, the feedback control system of FIGS. 3 and 4 is not adaptive during normal operation of the system. Filter 21 must be pre-trained off-line with broad band noise and then fixed, or can only be used adaptively on-line with exclusively broad band noise input. These conditions are not practical.

There is a need for truly adaptive feedback cancellation in an active attenuation system, wherein the feedback is adaptively cancelled on-line for both broad band and narrow band noise without dedicated off-line pre-training, and wherein the cancellation further adapts on-line for changing feedback path characteristics such as temperature and the like.

Present Invention

FIG. 5 shows a modeling system in accordance with the invention, and like reference numerals are used from FIGS. 1-4 where appropriate to facilitate clarity. Acoustic system 4, such as a duct or plant, is modeled with an adaptive filter model 40 having a model input 42 from input microphone or transducer 10 and an error input 44 from output microphone or transducer 16, and outputting a correction signal at 46 to omnidirectional speaker or transducer 14 to introduce cancelling sound or acoustic waves such that the error signal at 44 approaches a given value such as zero. In FIG. 5, sound from speaker 14 is permitted to travel back along feedback path 20 to input microphone 10 comparably to FIG. 3, and unlike FIG. 1 where such feedback propagation is prevented by unidirectional speaker array 13. The use of an omnidirectional speaker is desirable because of its availability and simplicity, and because it eliminates the need to fabricate a system of speakers or other components approximating a unidirectional arrangement.

In accordance with the invention, feedback path 20 from transducer 14 to input microphone 10 is modeled with the same model 40 such that model 40 adaptively models both acoustic system 4 and feedback path 20. The invention does not use separate on-line modeling of acoustic system 4 and off-line modeling of feedback path 20. In particular, off-line modeling of the feedback path 20 using broad band noise to pretrain a separate dedicated feedback filter is not necessary. Thus, in the prior art of FIG. 4, the feedback path F at 20 is modeled separately from the direct path 4 at plant P, with a separate model 21 at F' pretrained solely to the feedback path and dedicated thereto as above noted. In the present invention, the feedback path is part of the model 40 used for adaptively modeling the system.

FIG. 6 shows the system of FIG. 5 in accordance with the invention, wherein acoustic system 4 and feedback path 20 are modeled with a single filter model 40 having a transfer function with poles used to model feedback path 20. This is a significant advance over the art because it recognizes that individual finite impulse response (FIR) filters shown in FIGS. 3 and 4 are not adequate to truly adaptively cancel direct and feedback noise. Instead, a single infinite impulse respone (IIR) filter is needed to provide truly adaptive cancellation of the direct noise and acoustic feedback. In accordance with the invention, the acoustic system and the feedback path are modeled on-line with an adaptive recursive filter model. Since the model is recursive, it provides the IIR characteristic present in the acoustic feedback loop wherein an impulse will continually feed upon itself in feedback manner to provide an infinite response.

As noted in the above referenced Warnaka et al U.S. Pat. No. 4,473,906, column 16, lines 8+, the adaptive cancelling filter in prior systems is implemented by a transversal filter which is a non-recursive finite impulse response filter. These types of filters are often referred to as all-zero filters since they employ transfer functions whose only roots are zeros, "VLSI Systems Designed for Digital Signal Processing", Bowen and Brown, Vol. 1, Prentice Hall, Englewood Cliffs, N.J., 1982, pp. 80–87. To adaptively model acoustic system 4 and feedback path 20 with a single filter model 40 requires a filter with a transfer function containing both zeros and poles. Such poles and zeros are provided by a recursive IIR algorithm. The present invention involves providing an IIR recursive filter model to adaptively model acoustic system 4 and feedback path 20. This problem has been discussed by Elliot and Nelson in I.S.V.R. Technical Report No. 127, Southampton University, England, published in U.S. Department of Commerce, National Technical Information Service, Bulletin No. PB85189777, April 1984. In discussing the use of recursive models for use in active attenuation systems, Elliot et al note, page 37, that the number of coefficients used to implement the direct and feedback modeling can desirably be kept to a minimum, however they further note that there is "no obvious method" to use in obtaining the responses of the recursive structure. In the conclusion on page 54, last paragraph, Elliott et al note that "no procedure has yet been developed for adapting the coefficients of a recursive IIR filter to obtain the best attenuation". The present invention provides a system that solves this problem and adaptively determines these coefficients in a practical system that is effective on broad band as well as narrow band noise.

The poles of the transfer function of the model 40 result in a recursive characteristic that is necessary to simultaneously model the acoustic system 4 and the feedback path 20. The response of model 40 will feedback upon itself and can be used to adaptively cancel the response of the feedback path 20 which will also feedback upon itself. In contrast, in an FIR filter, there is no feedback loop but only a direct path through the system and only zeros are possible, as in the above noted Tichy et al article and Warnaka et al patent, i.e., the zeros of the numerator of the transfer function. Thus, two individual models must be used to model the acoustic system 4 and feedback path 20.

For example, in Tichy et al and Warnaka et al, two independent models are used. The feedback path is modeled ahead of time by pre-training the feedback filter model off-line. In contrast, in the present invention, the single model adapts for feedback on-line while the system is running, without pre-training. This is significant because it is often impossible or not economically feasible to retrain for feedback every time the feedback path characteristics change, e.g., with changing temperature, flow rate, etc. This is further significant because it is not known when narrow band noise such as a tone may be included in the input noise, and must be adaptively accommodated and compensated for.

FIG. 7 shows one form of the system of FIG. 6. The feedback element B at 22 is adapted by using the error signal at 44 as one input to model 40, and the correction signal at 46 as another input to model 40, together with the input at 42. The direct element A at 12 has an output summed at 48 with the output of the feedback element B at 22 to yield the correction signal at 46 to speaker or transducer 14 and hence summer 18.

In FIG. 8, the input to feedback element B at 22 is provided by the output noise at 50 instead of the correction signal at 46. This is theoretically desirable since the correction signal at 46 tends to become equal to the output noise at 50 as the model adapts. Improved performance is thus possible through the use of the output noise 50 as the input to the feedback element B from the beginning of operation. However, it is difficult to measure the output noise without the interaction of the cancelling sound from speaker 14. FIG. 9 shows a particularly desirable implementation in accordance with the invention enabling the desired modeling without the noted measurement problem. In FIG. 8, the feedback element is adapted at B using the error signal at 44 from the output microphone as one input to model 40, and the output noise at 50 as another input to model 40. In FIG. 9, the error signal at 44 is summed at summer 52 with the correction signal at 46, and the result is provided as another input at 54 to model 40. This input 54 is equal to the input 50 shown in FIG. 8, however it has been obtained without the impractical acoustical measurement required in FIG. 8. In FIGS. 7–9, one of the inputs to model 40 and to feedback element B component 22 is supplied by the overall system output error signal at 44 from output microphone 16. The error signal at 44 is supplied to feedback element B through multiplier 45 and multiplied with input 51, yielding weight update 47. Input 51 is provided by correction signal 46, FIG. 7, or by noise 50, FIG. 8, or by sum 54, FIG. 9. The error signal at 44 is supplied to direct element A through multiplier 55 and multiplied with input 53 from 42, yielding weight update 49.

The invention enables in its preferred embodiment the use of a recursive least mean square (RLMS) algorithm filter, for example "Comments on 'An Adaptive Recursive LMS Filter'", Widrow et al, Proceedings of the IEEE, Vol. 65, No. 9, September 1977, pp. 1402–1404, FIG. 2. The invention is particularly desirable in that it enables the use of this known recursive LMS algorithm Filter. As shown in FIG. 10, illustrating the system of FIG. 7, the direct element A at 12 may be modeled by an LMS filter, and the feedback element B at 22 may be modeled with an LMS filter. The adaptive recursive filter model 40 shown in the embodiment of FIG. 10 is known as the recursive least mean square (RLMS) algorithm.

In FIG. 11, showing the system in FIG. 9, the feedback path 20 is modeled using the error signal at 44 as one input to model 40, and summing the error signal at 44 with the correction signal at 46, at summer 52, and using the result at 54 as another input to model 40.

The delay, if any, in output 8 between speaker 14 and microphone 16, may be compensated for by a comparable delay at the input 51 to LMS filter 22 and/or at the input 53 to LMS filter 12.

The present invention thus models the acoustic system and the feedback path with an adaptive filter model having a transfer function with poles used to model the feedback path. It is of course within the scope of the invention to use the poles to model other elements of the acoustic system in combination with modeling the feedback path. It is also within the scope of the invention to model the feedback path using other characteristics, such as zeros, in combination with the poles.

It is recognized that various equivalents, alternatives and modifications are possible within the scope of the appended claims.

What is claimed is:

1. In an acoustic system having an input for receiving an input acoustic wave and an output for radiating an output acoustic wave, an active attenuation method for attenuating undesirable said output acoustic wave by introducing a cancelling acoustive wave from an output transducer, and for adaptively compensating for feedback to said input from said output transducer for both broad band and narrow band acoustic waves without pre-training, comprising:

sensing said input acoustic wave with an input transducer;

sensing the combined said output acoustic wave and said cancelling acoustic wave from said output transducer with an error transducer providing an error signal;

modeling said acoustic system with an adaptive filter model having a model input from said input transducer and an error input from said error transducer and outputting a correction signal to said output transducer to introduce the cancelling acoustic wave such that said error signal approaches a specified value;

modeling the feedback path from said output transducer to said input transducer with the same said model, without a separate model pre-trained solely to said feedback path, by modeling said feedback path as part of said model such that the latter adaptively models both said acoustic system and said feedback path, without separate modeling of said acoustic system and said feedback path and dedicated pre-training of the latter with a broad band acoustic wave.

2. The invention according to claim 1 comprising modeling said acoustic system and said feedback path with an adaptive filter model having a transfer function comprising poles used to model said feedback path.

3. The invention according to claim 2 comprising modeling said acoustic system and said feedback path on-line with an adaptive recursive filter model.

4. The invention according to claim 3 comprising modeling said acoustic system and said feedback path with a recursive least mean square algorithm filter.

5. The invention according to claim 1 comprising modeling said feedback path by using said error signal from said error transducer.

6. The invention according to claim 1 comprising modeling said feedback path by using said error signal from said error transducer as one input to said model and said correlation signal to said output transducer as another input to said model.

7. The invention according to claim 1 comprising modeling said feedback path by using said error signal from said error transducer as one input to said model and said output noise as another input to said model.

8. The invention according to claim 7 comprising deriving said output noise by summing said error signal with said correction signal.

9. The invention according to claim 1 comprising modeling said feedback path using said error signal from said error transducer as one input to said model, and summing said error signal with said correction signal and using the result as another input to said model.

10. In an acoustic system having an input for receiving an input acoustic wave and an output for radiating an output acoustic wave, an active attenuation system for attenuating undesirable said output acoustic wave by introducing a cancelling acoustic wave from an output transducer, and for adaptively compensating for feedback to said input from said output transducer for both broad band and narrow band acoustic waves without pre-training, comprising:

- an input transducer for sensing said input acoustic wave and providing an input signal;
- an error transducer for sensing the combined said output acoustic wave and said cancelling acoustic wave from said output transducer and providing an error signal;
- a filter model adaptively modeling said acoustic system on-line without dedicated off-line pretraining, and also adaptively modeling the feedback path from said output transducer to said input transducer on-line for both broad band and narrow band acoustic waves without dedicated off-line pretraining, and outputting a correction signal to said output transducer to introduce said cancelling acoustic wave.

11. The invention according to claim 10 wherein said model comprises means adaptively modeling said feedback path as part of said model itself without a separate model dedicated solely to said feedback path and pretrained thereto.

12. The invention according to claim 11 wherein said model has a transfer function comprising poles used to model said feedback path.

13. The invention according to claim 12 wherein said model comprises an adaptive recursive filter.

14. The invention according to claim 13 wherein said model comprises a recursive least mean square filter.

15. The invention according to claim 11 wherein said model comprises:

- first algorithm means having a first input from said input signal from said input transducer, a second input from said error signal from said error transducer, and an output;
- second algorithm means having a first input from said correction signal to said output transducer, a second input from said error signal from said error transducer, and an output; and
- a summing junction having inputs from said outputs of said first and second algorithm means, and an output providing said correction signal to said output transducer.

16. The invention according to claim 15 wherein said first and second algorithms are least mean square algorithms.

17. The invention according to claim 11 wherein said model comprises:

- first algorithm means having a first input from said input signal from said input transducer, a second input from said error signal from said error transducer, and an output;
- second algorithm means having a first input from said output acoustic wave, a second input from said error signal from said error transducer, and an output; and
- a summing junction having inputs from said outputs of said first and second algorithm means, and an output providing said correction signal to said output transducer.

18. The invention according to claim 11 wherein said model comprises:

- first algorithm means having a first input from said input signal from said input transducer, a second input from said error signal from said error transducer, and an output;
- a first summing junction having a first input from said error signal from said error transducer, a second input from said correction signal to said output transducer, and an output;
- second algorithm means having a first input from said output of said first summing junction, a second input from said error signal from said error transducer, and an output; and
- a second summing junction having inputs from said outputs of said first and second algorithm means, and an output providing said correction signal to said output transducer.

19. The invention according to claim 18 wherein said first and second algorithms are least mean square algorithms.

20. The invention according to claim 11 wherein said input transducer and error transducer are microphones, and said output transducer is an omnidirectional speaker.

* * * * *